Figure 1:
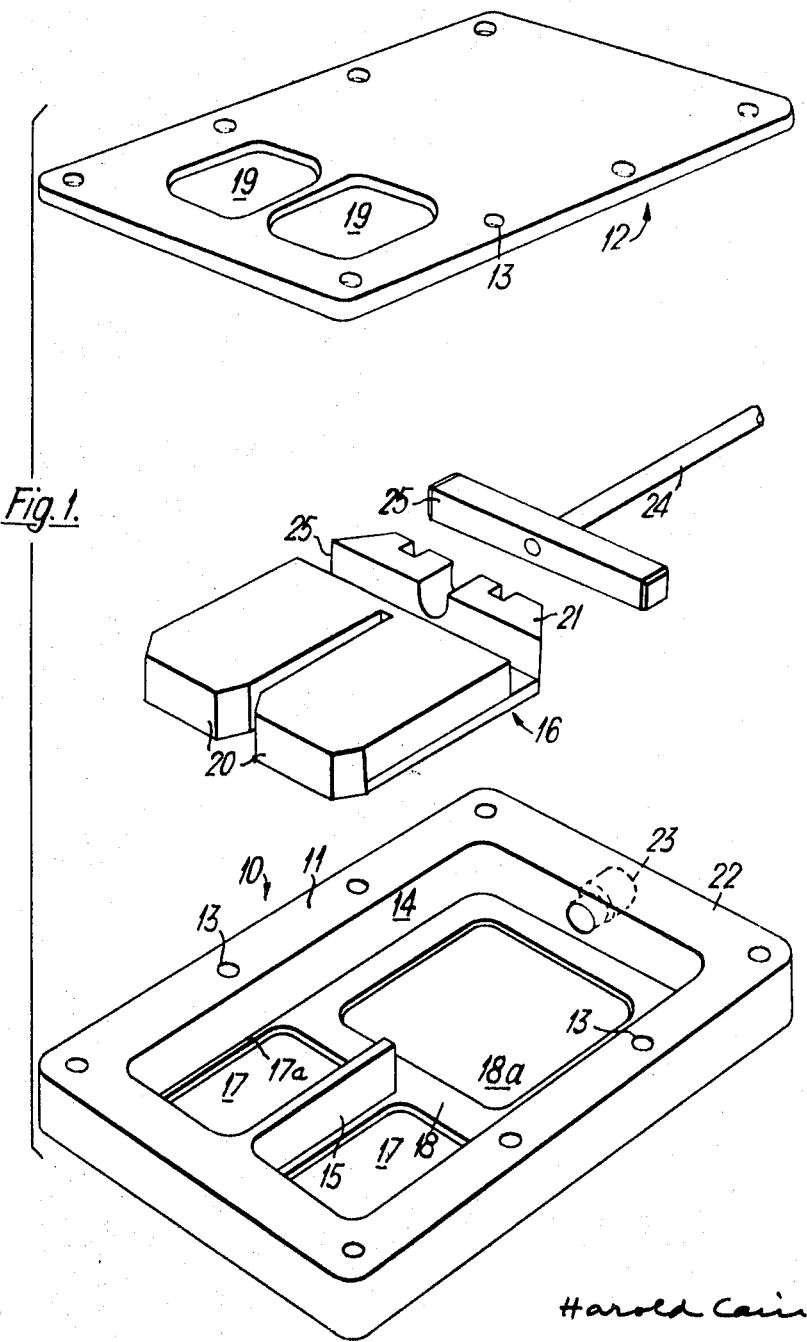

United States Patent

[11] 3,621,878

| [72] | Inventor | Harold Cain Smith<br>121 Murry Farm Road, Beecroft, New South Wales, Australia |
|---|---|---|
| [21] | Appl. No. | 857,706 |
| [22] | Filed | Sept. 15, 1969 |
| [45] | Patented | Nov. 23, 1971 |

[54] VALVE FOR EXHAUST BRAKE SYSTEMS
3 Claims, 6 Drawing Figs.

| [52] | U.S. Cl. | 137/595 |
|---|---|---|
| [51] | Int. Cl. | F16k 11/00 |
| [50] | Field of Search | 137/594, 595, 625.25, 353, 625.18; 251/329, 330 |

[56] References Cited
UNITED STATES PATENTS

| 998,994 | 7/1911 | Smith | 251/329 X |
|---|---|---|---|
| 1,565,485 | 12/1925 | Melsom | 251/330 X |
| 2,329,315 | 9/1943 | Allen | 259/329 X |
| 1,198,996 | 9/1916 | Brown | 137/595 X |
| 1,529,178 | 3/1925 | Greenwood | 137/625.25 |
| 3,166,090 | 1/1965 | Davis | 137/353 |
| 3,494,377 | 2/1970 | Thuse | 137/625.18 |

Primary Examiner—Henry T. Klinksiek
Attorney—Howard G. Russell

ABSTRACT: The invention concerns an engine braking slide valve for use in a vehicle exhaust system between an exhaust manifold and a gas-driven impeller or turbine for driving a supercharged-type blower. The valve is characterized by a casing having a body portion and a cover portion between which a valve member is slidable to cover and uncover aligned ports in the body and cover portion, the valve member in being so slidable requiring a minimum of effort to move it between the open and "brake" position and being self-cleaning in operation.

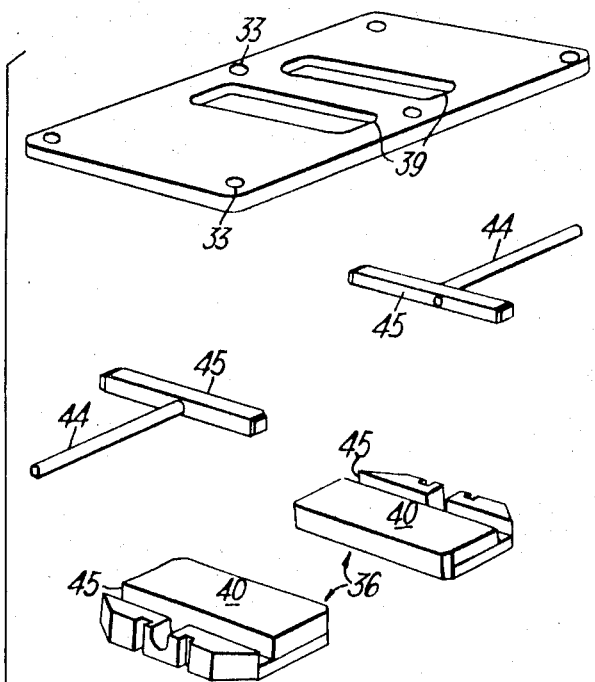
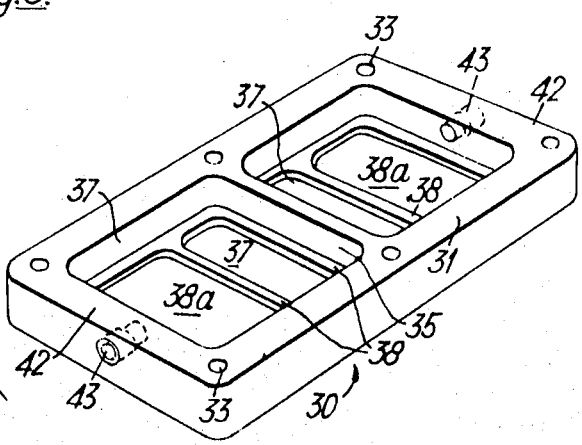
Fig.3.

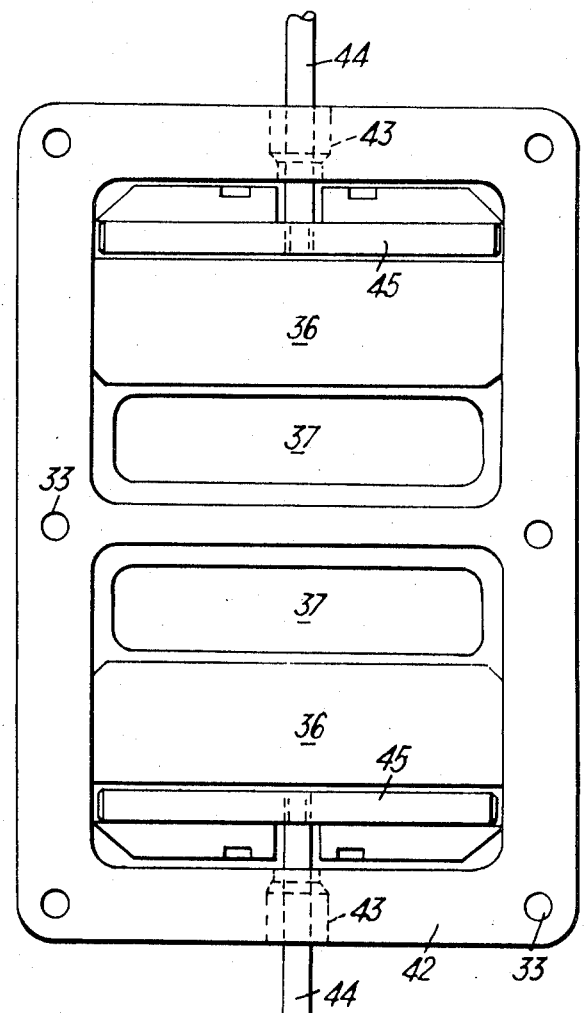

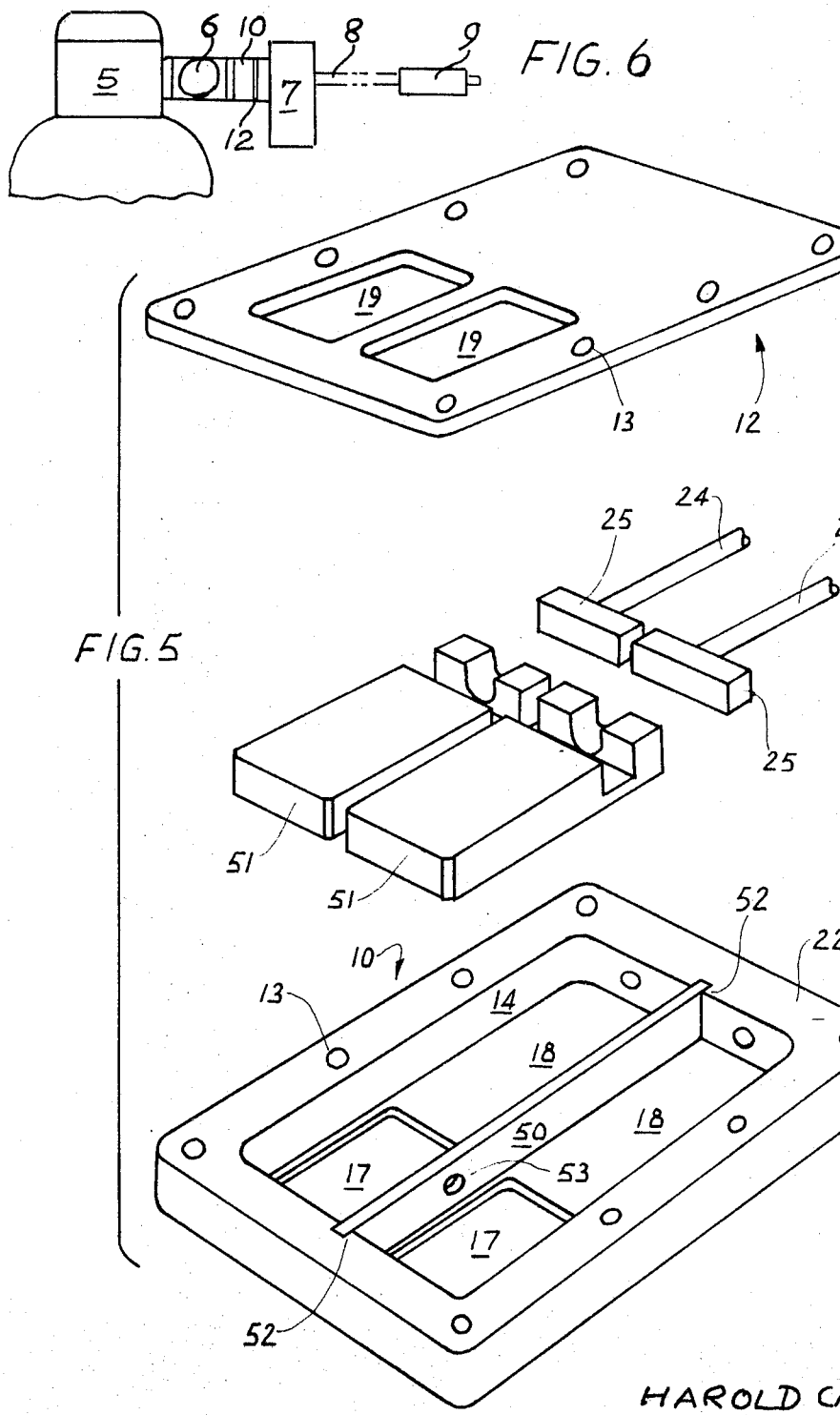

VALVE FOR EXHAUST BRAKE SYSTEMS

This invention relates to an improved engine braking valve for use in a vehicle exhaust system and, in particular, to one which is adaptable to a vehicle exhaust system which incorporates a gas-driven impeller or turbine for driving a supercharger-type blower; such blower forming a portion of the induction system of the vehicle.

In a vehicle incorporating a simple induction system, i.e. one which does not employ an exhaust gas-driven supercharger, a valve operable to restrict the flow of exhaust gas and to thus create a "braking back pressure" may be located at any position in the exhaust pipe between the exhaust manifold and the exhaust muffler, or outlet where no manifold is employed.

However, if a valve be inserted in the exhaust pipe between a gas-driven impeller or turbine (hereinafter referred to as an impeller for ease of reference) and the muffler or outlet, the desired back pressure which builds up within the exhaust pipe and manifold upon closure of the valve causes damage to the impeller components and results in gas leakage from the impeller.

(It should be noted that the term "impeller" as herein employed is intended to refer not only to the impeller wheel or rotor per se, but to an entire unit including its housing, shaft, bearings, seals and associated components).

An attempt has been made to overcome the above problem by locating a butterfly-type valve in the outlet port of exhaust manifolds; i.e., before the impeller in the direction of exhaust gas flow. However it has been found that such valves are not successful in this application. They require application of a high force to close them against prevailing gas pressure and when fully open provide considerable resistance to gas flow. Furthermore, unless they are fabricated from a highly heat-resistant material they are, by virtue of their inherent slender construction, soon rendered inoperable by intense local heat. Moreover, the size of the exhaust manifold is considerably increased by their inclusion therein.

It is an object of the present invention to provide a simple valve for an exhaust brake system, which may be mounted between an exhaust manifold and an exhaust gas-driven impeller, which is retractable away from the path of exhaust gases, which offers little or no resistance to the flow of exhaust gas when so retracted, which does not unduly influence the direction or velocity of gas flow into the impeller, which requires a minimum force to urge it into the open or closed position, and which is preferably adjustable to permit passage of a desired portion only of the exhaust gas.

Thus, the present invention provides a valve for an exhaust brake system comprising a valve casing having at least one inlet port in one side of said casing aligned with at least one outlet port in the other side of said casing, said casing being adapted to be inserted in an exhaust gasline between an exhaust manifold and an impeller, at least one valve member slidable in said casing constructed and adapted, in its operating position, to extend at least partially across and between the (or each of the) aligned inlet and outlet ports and, in its retracted position, to permit free or substantially free passage of the exhaust gas between the aligned ports, and said valve member(s) being connected to an actuating element passing through an aperture in the valve casing and movable to operate said valve member(s).

In accordance with one embodiment of the invention there are two inlet ports aligned with two outlet ports in said casing and the valve member comprises two gate valves which are joined by a mutual bridging piece.

It is desirable in heavy vehicles employing a twin-ported exhaust manifold to at least partially blank off only one of said ports by means of an exhaust valve in order to effect rapid deceleration of the motor to permit controlled gear changing in the automatic transmission. Also, it is customary in some large diesel engines (commonly referred to as dual-diesel engines) to cut off the fuel injection to a number of the cylinders which are connected to a common exhaust manifold port for the purpose of using those cylinders as a compressor unit, the remaining "firing" cylinders providing the drive therefor. The compressed air thus provided is piped off for driving ancillary equipment associated with the vehicle and one of a pair of exhaust brake valves is preferably employed for controlling the pressure of the compressed air.

Thus, in accordance with a further embodiment of the invention, there are at least two inlet ports aligned with a corresponding number of outlet ports in said casing, and there are a number of valve members, corresponding with the number of inlet ports, which are independently slidable in said casing between the respective inlet and outlet ports.

Figure 2:
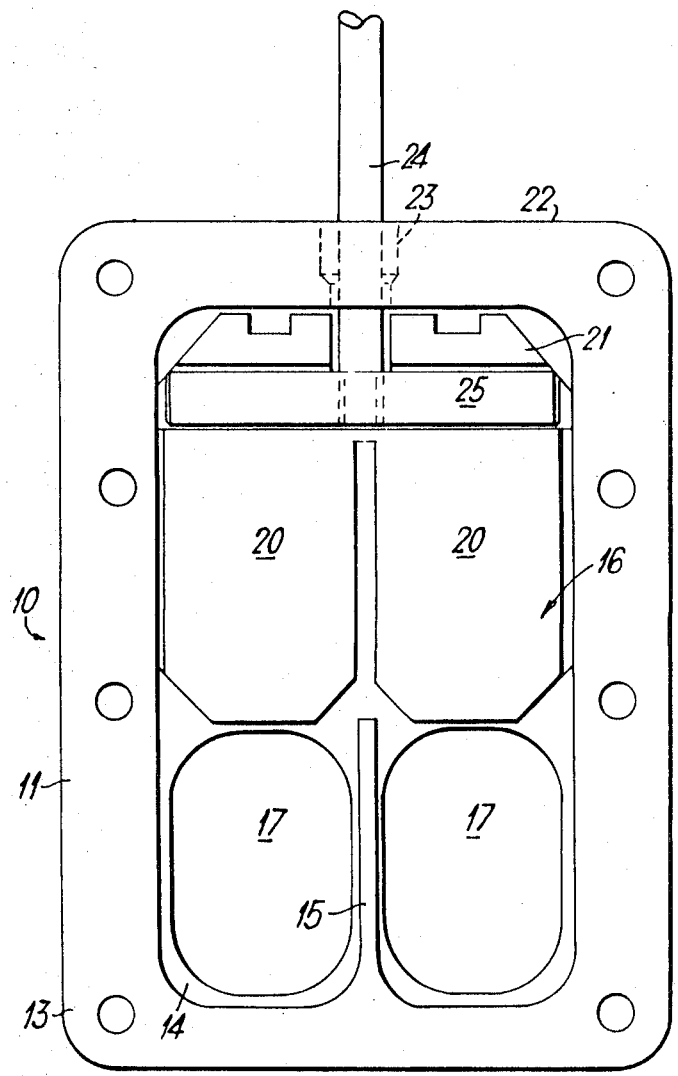

The invention will be more fully understood from the following description of a number of embodiments thereof, taken in conjunction with the accompanying drawings wherein, FIG. 1 shows, in perspective, an exploded view of a complete valve assembly in accordance with one embodiment of the invention, FIG. 2 shows, in elevation, an assembled view of the valve of FIG. 1, a sliding valve member thereof being shown in the retracted position and a cover member thereof being shown removed for illustrative purposes, FIG. 3 shows, in perspective, an exploded view of a complete valve assembly in accordance with a second embodiment of the invention, FIG. 4 shows, in elevation, an assembled view of the valve of FIG. 3, a sliding valve member thereof being shown in the retracted position and a cover member thereof being shown removed for illustrative purposes, FIG. 5 shows, in perspective, an exploded view of a complete valve assembly in accordance with a third embodiment of the invention, and FIG. 6 is a diagrammatic illustration of an engine exhaust brake system comprising the improved valve.

With reference to the embodiment of the invention illustrated by FIGS. 1 and 2 of the drawings:

A valve casing 10 comprises a main body member 11, a cover member 12 therefor and, if desired, a gasket (not shown) for location between the mating faces of the two components 11 and 12. Both the main body member 11 and the cover member 12 are correspondingly apertured (as at 13) for bolting together and for bolting between opposed flange faces of a twin-ported exhaust manifold 6 of an engine 5 and an impeller 7 in the exhaust duct 8 (see FIG. 6) of the type hereinbefore referred to, both valve 10 and impeller 7 being upstream of a muffler 9.

The interior 14 of the main body member 11 is, except for an upstanding central flange 15 which extends for almost half the length of the interior portion 14, recessed to provide a chamber in which a substantially flat valve member 16 may slide.

A pair of rectangular-shaped apertures 17 (herein referred to as inlet ports) are provided in the wall 18 of the main body member at one end thereof, one at each side of the upstanding wall 15. Each of the apertures 17 has an area slightly less than the area bounded by the interior sidewalls of the body member and the upstanding wall 15 thus forming a relatively narrow internal valve member engaging margin 17a of substantially uniform width about at least three sides of the four-sided port, assuming that in the open position the ends 20 of the valve member 16 lie flush with one side of the ports 17. The apertures thus constitute two separate ports. These ports are positioned and dimensioned to correspond with those in a manifold 6 against which the valve assembly is adapted to abut (FIG. 6).

The cover member 12 is similarly apertured, at 19, to provide a pair of outlet ports which align mutually with both the inlet ports 17 and ports in an impeller housing 7 against which the valve assembly is adapted to abut.

The recessed portion 14 of the main body member uncluttered by the upstanding wall provides a passage in which the flat sliding valve member 16 may move to uncover the ports—to permit flow of exhaust gas therethrough. The wall 18 of the recessed portion 14 may incorporate a shallow recess 18a to reduce the effective friction surface.

The valve member 16 comprises two gate valve halves 20 which are joined by a mutual bridging piece 21 to provide a unitary structure, the halves being separated by a distance slightly greater than the width of the wall 15 separating the inlet ports 17 in the main body member 11. The wall 15 extends between the two gate valve halves 20 and serves to guide and stabilize them.

The valve member 16 is slidable in the recessed portion 14 of the main body member 11 and between the bottom wall 18 of said member and the cover member 12 so as to simultaneously seal (or unseal) each of the pair of opposed apertures 17, 19 in the two casing members 11 and 12.

The recessed portion 14 of the main body member 11 has a length permitting the valve member 16 to completely uncover the apertures 17, 19 when it is retracted, as illustrated by FIG. 2. When in open position there remain substantially no void internal pockets due to the narrowness of the marginal shoulders 17a.

One end wall 22 of the main body member, that is the wall remote from the apertured end of the casing, is apertured and bushed at 23 and a rod 24 extends therethrough and connects with the said bridging portion 21 of the valve member 16. To permit relative movement between the connecting rod 24 and the valve member 16, connection therebetween is preferably by way of a tee and slot joint 25, clearance being provided in the joint.

Depending upon the disposition of the valve assembly in an exhaust system, the inlet and outlet ports as herein described may, in fact, become outlet and inlet ports respectively.

The main body member 11, the cover 12 therefor and the valve member 16 may, for example, be manufactured from cast iron; the rod 24 from stainless steel, and the bush 23 from phosphor bronze.

Various methods may be employed for controlling the movement and the extent of movement of the valve member in the casing: The rod 24 would normally be connected to a piston housed within a hydraulic or pneumatic cylinder (not shown) for actuation of the valve member 16 between the "braking" and the retracted positions, respectively, within the casing. The piston within the cylinder may be spring biased to either the retracted position or to the "braking" position (to achieve a fail-safe condition), or the cylinder may constitute a double-acting cylinder. The cylinder would be connected in a suitable fluid circuit for operation by the vehicle driver or responsive to, for example, pneumatic braking or closing of the vehicle throttle.

Alternatively, the rod 24 may be connected through a mechanical linkage with a control lever in the vehicle cabin or with, for example, the vehicle throttle or pneumatic braking mechanism.

The extent of movement of the rod 24 may be controlled by, for example, locating an adjustable stop on the rod or on the mechanism with which the rod is connected.

Referring now to the embodiment of the invention illustrated by FIGS. 3 and 4 of the drawings:

A valve casing 30 comprises a main body member 31, a cover member 32 therefor and, if required, a gasket (not shown) for location between the mating faces of the two components 30 and 32. Both the main body member 31 and the cover member 32 are correspondingly apertured (as at 33) for bolting together and for bolting between and to opposed flange faces of a twin-ported exhaust manifold (not shown) and an impeller unit (also not shown) of the type hereinbefore described.

The interior 34 of the main body member 31 is, except for an upstanding central flange 35 which extends transversely across the width of the interior of the body member 34, recessed to provide two chambers in each of which a substantially flat valve member 36 may slide.

A pair of rectangular-shaped apertures 37 (herein referred to as inlet ports) are provided in the wall 38 of the main body member 31, one at each side of and adjacent the upstanding central flange 35. Each of the ports 37 has an area slightly less than half the area bounded by the sidewalls of the body member and the upstanding central flange 35 and thus they constitute two separate ports each within separate chambers. These ports are positioned and dimensioned to correspond with those in a manifold such as 6 against which the valve assembly is adapted to abut.

The cover member 32 is similarly apertured, at 39, to provide a pair of outlet ports which align mutually with both the inlet ports 37 and ports in an impeller housing 7 against which the valve assembly is adapted to abut.

The recessed portion 34 of the main body member at each side of the upstanding central flange 35 provides a passage in which one of the flat sliding valve members 36 may move to uncover the ports—to permit flow of exhaust gas therethrough. The wall 38 of the recessed portion of the casing upon which the valve members slide may incorporate a shallow recess 38a to reduce the effective friction surface.

Each valve member comprises a gate valve element 40.

Each valve member 36 is slidable in the respective recessed portion 34 of the main body member 31 and between the wall 38 of said member and the cover member 32 so as to simultaneously or independently seal (or unseal) each of the pair of opposed apertures 37, 39 respectively in the two casing members 31 and 32.

Each recessed portion 34 of the main body member has a length permitting the respective valve member 36 therein to completely uncover the apertures 37, 39 when it is retracted, as illustrated by FIG. 4.

Each end wall 42 of the main body member is apertured and bushed at 43 and a rod 44 extends therethrough and connects with the respective valve members. To permit relative movement between each connecting rod 44 and the respective valve member 36, connection therebetween is preferably by way of a tee and slot joint 45, clearance being provided in the joint.

Depending upon the disposition of the valve assembly in an exhaust system, the inlet and outlet ports as herein described may, in fact, become outlet and inlet ports respectively.

The materials from which the various elements of the valve may be constructed may be the same as those mentioned with reference to the FIGS. 1 and 2 embodiment hereinbefore described.

Devices as hereinbefore described with reference to the FIGS. 1 and 2 embodiment of the invention may be employed for controlling the movement and extent of movement of each valve member 36 in the casing, either independently or in unison. FIG. 5 of the drawings illustrates a valve assembly similar to that shown in FIGS. 1 and 2, but in which an upstanding central flange 50 extends for the entire length of the interior portion 14 to provide two separate chambers for receiving two independently slidable valve members 51. The flange 50, which extends for the entire length of the interior portion, need not be cast integral with the main body member but, instead, be constituted by a separate strip of metal which is held captive in slots 52 at each end of the main body member. A port or recess 53 may be provided in the central flange to permit equalization of pressure prevailing in the two chambers separated by the flange when the valve members are in the closed position.

It will be appreciated that valve of the present invention is "self-cleaning" and that any carbon or other solid products of combustion which adhere to the sliding valve member(s) during the "braking" (valve-closed) cycle will be scraped off during opening of the valve member(s) and be exhausted through the exhaust system.

What I claim is:

1. An engine braking valve for location in an exhaust line of an internal combustion engine, said valve comprising a valve casing, the body of which is recessed to house the two hereinafter recited valve members, said casing comprising a substantially flat cover member, there being two inlet ports in said body member separated by a metal strip, the ends of which are held captive in slots in the end walls of the body member, said strip forming a partitioning longitudinal wall along the full length of the body member, there being two outlet ports in said cover member aligned with said inlet ports, two valve members independently slidable in said casing for covering and uncovering said inlet and outlet ports, and actuating elements connected to said valve members, said elements passing through apertures in said valve casing.

2. In the exhaust gasline of an internal combustion engine which gasline comprises a valve downstream of the engine exhaust manifold, and in which said valve comprises a valve casing having at least one inlet port in one wall of the casing and at least one outlet port in the opposite wall of the casing, and at least one valve member within said casing, said valve member having parallel sides slidably engaging interior walls of the casing and being movable from a position covering said ports to a position uncovering said ports by sliding movement relatively to said interior walls, the improvement according to which the said ports and the ports covering-and-uncovering portion of the valve members are of substantially rectangular shape, said ports being slightly smaller than the respective covering and uncovering portion so as to leave a relatively narrow internal valve member engaging margin of substantially uniform width about at least three sides of the four-sided ports, the resulting marginal internal space being substantially filled by said valve member when in closing position and providing substantially no void internal pockets in the casing when the ports are uncovered.

3. A device as defined in claim 2 in which the valve casing is transversely subdivided to provide two separate interior chambers comprising a valve member in each chamber, the direction of movement from covering to uncovering position being opposite for the two valve members.

* * * * *